(12) United States Patent
Vempati et al.

(10) Patent No.: US 11,667,555 B2
(45) Date of Patent: Jun. 6, 2023

(54) GLASS REDOX CONTROL IN SUBMERGED COMBUSTION MELTING

(71) Applicant: Owens-Brockway Glass Container Inc., Perrysburg, OH (US)

(72) Inventors: Udaya Vempati, Perrysburg, OH (US); William Pinc, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 284 days.

(21) Appl. No.: 16/788,635

(22) Filed: Feb. 12, 2020

(65) Prior Publication Data
US 2021/0246062 A1     Aug. 12, 2021

(51) Int. Cl.
| | | |
|---|---|---|
| C03B 5/193 | (2006.01) | |
| C03B 5/18 | (2006.01) | |
| C03B 5/235 | (2006.01) | |
| C03B 5/225 | (2006.01) | |
| C03C 1/02 | (2006.01) | |
| C03C 3/078 | (2006.01) | |
| C03C 3/087 | (2006.01) | |

(Continued)

(52) U.S. Cl.
CPC ............ *C03B 5/2356* (2013.01); *C03B 5/193* (2013.01); *C03B 5/225* (2013.01); *C03B 5/2353* (2013.01); *C03C 1/02* (2013.01); *C03C 3/078* (2013.01); *C03C 3/087* (2013.01); *C03C 3/112* (2013.01); *C03C 4/02* (2013.01); *C03B 2211/23* (2013.01); *C03B 2211/40* (2013.01); *C03C 2204/00* (2013.01)

(58) Field of Classification Search
None
See application file for complete search history.

(56) References Cited

U.S. PATENT DOCUMENTS

| | | |
|---|---|---|
| 4,545,800 A | 10/1985 | Won et al. |
| 4,557,743 A | 12/1985 | Claes et al. |

(Continued)

FOREIGN PATENT DOCUMENTS

WO     2014057126 A1     4/2014

OTHER PUBLICATIONS

PCT Search Report and Written Opinion, PCT Int. Application No. PCT/US2021/017654, PCT Int. Filing Date: Feb. 11, 2021, Applicant: Owens-Brockway Glass Container Inc., dated May 28, 2021.

*Primary Examiner* — Jodi C Franklin (57) ABSTRACT

A method of producing glass using submerged combustion melting is disclosed. The method includes introducing a vitrifiable feed material into a glass melt contained within a submerged combustion melter. The glass melt contained in the melter has a redox ratio defined as a ratio of $Fe^{2+}$ to total iron in the glass melt. The method further includes combusting a combustible gas mixture supplied to each of the submerged burners to produce combustion products, and discharging the combustion products directly into the glass melt. Still further, the method includes adjusting the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt.

25 Claims, 5 Drawing Sheets

(51) Int. Cl.
*C03C 3/112* (2006.01)
*C03C 4/02* (2006.01)

(56) References Cited

U.S. PATENT DOCUMENTS

| | | | |
|---|---|---|---|
| 6,125,660 A | 10/2000 | Gorobinskaya et al. | |
| 6,871,514 B2 | 3/2005 | Muschik et al. | |
| 7,578,988 B2 | 8/2009 | Jacques et al. | |
| 8,498,320 B2 | 7/2013 | Kim et al. | |
| 9,611,164 B2 | 4/2017 | Jeanvoine et al. | |
| 10,752,537 B2* | 8/2020 | Ellison | C03B 37/04 |
| 10,759,688 B2* | 9/2020 | MacPhee | C03B 5/2356 |
| 2005/0164863 A1* | 7/2005 | Coster | C03C 3/087 |
| | | | 501/71 |
| 2008/0256981 A1 | 10/2008 | Jacques | |
| 2010/0313604 A1* | 12/2010 | Watson | C03B 5/2353 |
| | | | 65/347 |
| 2011/0098171 A1 | 4/2011 | Pedeboscq et al. | |
| 2013/0276481 A1* | 10/2013 | Kobayashi | C03B 5/237 |
| | | | 65/134.4 |
| 2014/0371116 A1* | 12/2014 | Hojaji | C03B 5/005 |
| | | | 523/219 |
| 2015/0232363 A1* | 8/2015 | Solvang | C03B 5/235 |
| | | | 110/182.5 |
| 2015/0344344 A1 | 12/2015 | Kobayashi et al. | |
| 2015/0344345 A1 | 12/2015 | Kobayashi et al. | |
| 2016/0207817 A1 | 7/2016 | Hojaji et al. | |
| 2017/0015579 A1* | 1/2017 | Charbonneau | F23D 14/22 |
| 2017/0066672 A1* | 3/2017 | Huber | C03B 5/2356 |
| 2017/0096358 A1* | 4/2017 | Martin | C03C 11/007 |
| 2018/0065877 A1* | 3/2018 | Faulkinbury | C03B 5/44 |
| 2018/0118600 A1 | 5/2018 | Francis, Jr. et al. | |
| 2018/0290920 A1* | 10/2018 | Ellison | C03C 3/062 |
| 2021/0094856 A1* | 4/2021 | Weil | C03B 5/202 |
| 2021/0094857 A1* | 4/2021 | Rashley | C03B 9/13 |
| 2021/0094858 A1* | 4/2021 | Wang | C03C 3/078 |
| 2021/0094859 A1* | 4/2021 | Wang | C03C 3/078 |
| 2021/0094860 A1* | 4/2021 | Pinc | C03C 1/004 |
| 2021/0094861 A1* | 4/2021 | Wang | C03B 5/2356 |
| 2021/0246060 A1* | 8/2021 | Vempati | C03C 3/112 |
| 2021/0246061 A1* | 8/2021 | Vempati | C03C 4/0092 |
| 2021/0246062 A1* | 8/2021 | Vempati | C03B 5/2356 |

* cited by examiner

GLASS REDOX CONTROL IN SUBMERGED COMBUSTION MELTING

The present disclosure is directed to the production of glass using submerged combustion technology and, more specifically, to methodologies for adjusting the redox ratio of the glass melt contained within a submerged combustion melter.

BACKGROUND

Glass is a rigid amorphous solid that has numerous applications. Soda-lime-silica glass, for example, is used extensively to manufacture flat glass articles such as windows, hollow glass articles including containers such as bottles and jars, as well as tableware and other specialty articles. Soda-lime-silica glass comprises a disordered and spatially crosslinked ternary oxide network of $Na_2O$—$CaO$—$SiO_2$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass articles more practical and less energy intensive while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

Soda-lime-silica glass has long been produced in a continuous melting furnace. When operating such a furnace, a vitrifiable feed material—one that is formulated to yield glass with a specific chemical composition and related properties—is fed on top of a large molten glass bath of a generally constant level contained in a melting chamber of the furnace. The molten glass bath is maintained at a temperature of about 1450° C. or greater so that the added feed material can melt, react, and progress through several intermediate melt phases before becoming chemically integrated into the molten glass bath as the bath moves slowly through the melting chamber of the furnace towards a refining chamber located downstream of the melting chamber. In the refining chamber, bubbles and other gaseous inclusions are removed from the molten glass bath to yield chemically homogenized and refined molten glass as needed for further processing. The heat needed to maintain the molten glass bath within the melting chamber has conventionally been supplied by non-submerged burners that combust a mixture of fuel and air/oxygen within an open combustion zone atmosphere located above the molten glass bath. The burners are located in burner ports on opposite sidewalls of the refractory superstructure that partially defines the combustion zone (cross fired furnace) or in a back wall of the refractory superstructure (end port fired furnace). It typically takes 24 hours or longer for feed material to melt and react through a conventional glass melting and fining operation before exiting the melter as a homogeneous molten glass.

The color of the finished glass article—such as a container, flat glass product, or tableware—is dependent on a number of variables. For instance, certain components of the vitrifiable feed material (e.g., sand, limestone, dolomite, recycled glass, etc.) may contain iron impurities. The iron may be present in two forms within the molten glass: (1) the ferrous or reduced state ($Fe^{2+}$ as FeO) or (2) the ferric or oxidized state ($Fe^{3+}$ as $Fe_2O_3$). Iron in the $Fe^{2+}$ state imparts a blue-green color to the molten glass and iron in the $Fe^{3+}$ states imparts a yellow color. The ratio of $Fe^{2+}$ to total iron ($Fe^{2+}+Fe^{3+}$) in the molten glass determines the redox ratio of the glass and gives a general indication of whether the blue-green color or the yellow color will dominate visually. To that end, the redox ratio of the molten glass often needs to be managed in order to achieve the desired glass coloration. For example, flint glass may be obtained from an oxidized molten glass having a redox ratio of 0.4 or less, green glass may be obtained from a more reduced molten glass having a redox ratio of 0.4 to 0.6, and amber glass may be obtained from an even more reduced molten glass having a redox ratio between 0.6 and 0.8.

In a conventional continuous melting furnace, the redox ratio of the molten glass bath has traditionally been set and adjusted by regulating the compositional recipe of the vitrifiable feed material being supplied to the furnace. The composition of the feed material can dictate the amount of redox agents in the molten glass bath and/or limit the overall iron content in the molten glass bath through the use of low-iron raw materials. Redox agents are compounds that have an oxidizing or reducing effect on the molten glass and can therefore shift the $Fe^{2+}/Fe^{3+}$ equilibrium towards the $Fe^{3+}$ state or the $Fe^{2+}$ state, respectively, thus altering the redox ratio of the molten glass bath and consequently driving the glass more towards a yellow color or a blue-green color when solidified. A common oxidizing redox agent that can shift the redox ratio downwards is sulfates ($SO_3$), which can be delivered to the molten glass bath from any of a variety of additive materials that are included in the vitrifiable feed material including, for example, salt cake, while a common reducing agent that can increase the redox ratio is carbon. Additionally, the inclusion of a substantial amount of flint cullet (i.e., recycled flint glass) to the feed material may dilute the iron impurities contained in the feed material and reduce or altogether eliminate the need to rely on certain redox agents when manufacturing glass of a certain color.

Various colorants, decolorants, or a combination of both may also be added to the molten glass bath to achieve glass color variations for a given redox ratio. Colorants and decolorants are compounds that absorb and transmit visible light at certain wavelengths to mask and/or accentuate certain colors in the glass. Several known examples of colorants and decolorants include selenium, cobalt oxide, chromium oxide, and manganese. Accordingly, the molten glass obtained from a conventional continuous melting furnace may have a redox ratio that supports forming glass articles of a desired color based on feed material specifications that may prescribe a certain proportion of flint cullet content and/or a certain quantity of secondary additive materials including redox agents, colorants, and/or decolorants. The various operating conditions of a continuous melting furnace have for the most part been selected and controlled for reasons unrelated to the color of the produced glass.

Submerged combustion (SC) melting is a melting technology that is also capable of producing glass, including soda-lime-silica glass, and has recently become a potentially viable alternative to the melting process employed in a conventional continuous melting furnace. Contrary to conventional melting practices, SC melting involves injecting a combustible gas mixture that contains fuel and an oxidant directly into and under the surface of a glass melt contained in a melter, typically though submerged burners mounted in the floor or sidewalls of the melter. The oxidant may be oxygen, air, or any other gas that contains a percentage of oxygen. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace in which the molten glass bath is heated primarily with radiant heat from overhead non-submerged burners. And while SC technology can melt and integrate the vitrifiable feed material into the glass melt relatively quickly, the glass melt tends to be foamy and have a relatively low density despite being chemically homogenized when discharged from the melter. Indeed, the glass melt in an SC melter may include anywhere from 30 vol % to 60 vol % of entrained gas bubbles.

The relatively high heat transfer and mixing efficiency of the SC melter allows for a fundamentally different melter design than that of a conventional continuous melting furnace. Apart from the differences in burner design and location, an SC melter can be smaller than a conventional continuous melting furnace on the order of 50% to 90% in terms of tons of molten glass holding capacity at steady-state. The smaller size of an SC melter makes external cooling both technically and economically feasible. The smaller size of an SC melter and the fact that it can be externally cooled enables the melter to be shut down and emptied, and then restarted, quickly and efficiently when necessitated by production schedules or other considerations. This type of operational flexibility is not practical for a conventional continuous melting furnace. Additionally, the SC melter may include non-submerged burners located above the glass melt to heat and optionally impinge on the turbulent glass melt surface during SC melter operation to suppress foaming, whereas a conventional continuous melting furnace only uses non-submerged burners for radiant heat transfer.

In the past, SC melting has not been used to manufacture container and float glass articles on a commercial scale. In that regard, there has been little to no interest in adapting SC melting operations to produce glass, especially soda-lime-silica glass, that is able to consistently meet strict color specifications. And the adaption of an SC melter to support the production of soda-lime-silica glass articles is not necessarily a straightforward task since legacy vitrifiable feed material formulations tailored to produce a particular glass color do not translate well to SC melting. The reason for this discrepancy is believed to be related to the fundamentally different way in which the vitrifiable feed material is melted within a turbulent glass melt contained in an SC melter. In SC melting, as explained above, combustion products are discharged from submerged burners directly into a turbulent glass melt, whereas in conventional legacy processes combustion products are discharged into an open atmosphere above a much calmer molten glass bath. A glass production strategy that enables the redox ratio of the glass melt contained in an SC melter to be adjusted without necessarily requiring modifications to the composition of the vitrifiable feed material would help improve the glassmaking operation in an SC melter and ensure that glass articles of a certain color can be reliably manufactured.

SUMMARY OF THE DISCLOSURE

The present disclosure describes a method for adjusting the redox ratio of a glass melt produced in a submerged combustion melter. The disclosed method involves controlling at least one of three operating conditions of the SC melter that have been determined to have an influence on the redox ratio of the glass melt. The particular SC melter operating conditions include (1) the oxygen-to-fuel ratio of the combustible gas mixture injected by each of the submerged burners, (2) the residence time of the glass melt, and (3) the gas flux through the glass melt. The redox ratio of the glass melt is considered to be "adjusted" when the redox ratio is shifted relative to what is otherwise inherently attributable to the composition of the vitrifiable feed material in the absence of controlling the operating condition(s). The ability to adjust the redox ratio of the glass melt through control of the operating condition(s) can help achieve certain glass colorations with less reliance on the composition of the vitrifiable feed material, can allow for rapid changes in redox ratio, and can permit modifications to the composition of the vitrifiable feed material that otherwise might not be possible.

The redox ratio of the glass melt can be adjusted in several ways depending on the desired outcome by controlling one, any combination of two, or all three of the above-identified operating conditions. The redox ratio may be shifted up (more reduced glass) or down (more oxidized glass) depending on the color of the glass being produced to help minimize the need to include certain redox agents in the vitrifiable feed material. The redox ratio may also be increased to shift the glass melt to a more reduced state, or it can be decreased to shift the glass melt to a more oxidized state, to help transition between glass colorations without necessarily having to alter the quantity of redox agents included in the vitrifiable feed material being fed to the submerged combustion melter. Still further, the redox ratio may be maintained at a target value within acceptable tolerances despite modifications to the composition of the vitrifiable feed material that might otherwise cause the redox ratio to fluctuate beyond what is acceptable for a particular glass coloration. The ability to counteract or neutralize these unwanted redox ratio variances can enable the use of a wider range of vitrifiable feed material compositions for a given glass color that might otherwise not be possible if the redox ratio of the glass melt is dictated solely by the composition of the feed material.

The present disclosure embodies a number of aspects that can be implemented separately from or in combination with each other to provide a method for producing glass. According to one embodiment of the present disclosure, a method of producing glass using submerged combustion melting includes introducing a vitrifiable feed material into a glass melt contained within a submerged combustion melter. The submerged combustion melter comprises one or more submerged burners supplied with a combustible gas mixture that comprises fuel and oxygen, and the glass melt contained therein has a redox ratio defined as a ratio of $Fe^{2+}$ to total iron in the glass melt. The method further includes combusting the combustible gas mixture supplied to each of the submerged burners to produce combustion products, and discharging the combustion products from the one or more submerged burners directly into the glass melt to transfer heat to, and agitate, the glass melt. Still further, the method calls for adjusting the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt.

According to another aspect of the present disclosure, a method of producing glass using submerged combustion melting includes introducing a vitrifiable feed material into a glass melt contained within a submerged combustion melter. The submerged combustion melter comprises one or more submerged burners supplied with a combustible gas mixture that comprises fuel and oxygen, and the glass melt contained therein has a redox ratio defined as a ratio of $Fe^{2+}$ to total iron in the glass melt. The method further includes combusting the combustible gas mixture supplied to each of the submerged burners to produce combustion products, and discharging the combustion products from the one or more submerged burners directly into the glass melt to transfer heat to, and agitate, the glass melt. In yet another step, the method calls for increasing the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt. In particular, the step of controlling the one or more operating conditions of the submerged combustion melter comprises at least one of (1) increasing the oxygen-to-fuel ratio of the combustible gas mixture supplied to each of the submerged burners, (2) decreasing the residence time of the glass melt, or (3) decreasing the gas flux through the glass melt.

According to still another aspect of the present disclosure, a method of producing glass using submerged combustion melting includes introducing a vitrifiable feed material into a glass melt contained within a submerged combustion melter. The submerged combustion melter comprises one or more submerged burners supplied with a combustible gas mixture that comprises fuel and oxygen, and the glass melt contained therein has a redox ratio defined as a ratio of $Fe^{2+}$ to total iron in the glass melt. The method further includes combusting the combustible gas mixture supplied to each of the submerged burners to produce combustion products, and discharging the combustion products from the one or more submerged burners directly into the glass melt to transfer heat to, and agitate, the glass melt. In yet another step, the method calls for decreasing the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt. In particular, the step of controlling the one or more operating conditions of the submerged combustion melter comprises at least one of (1) decreasing the oxygen-to-fuel ratio of the combustible gas mixture supplied to each of the submerged burners, (2) increasing the residence time of the glass melt, or (3) increasing the gas flux through the glass melt.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
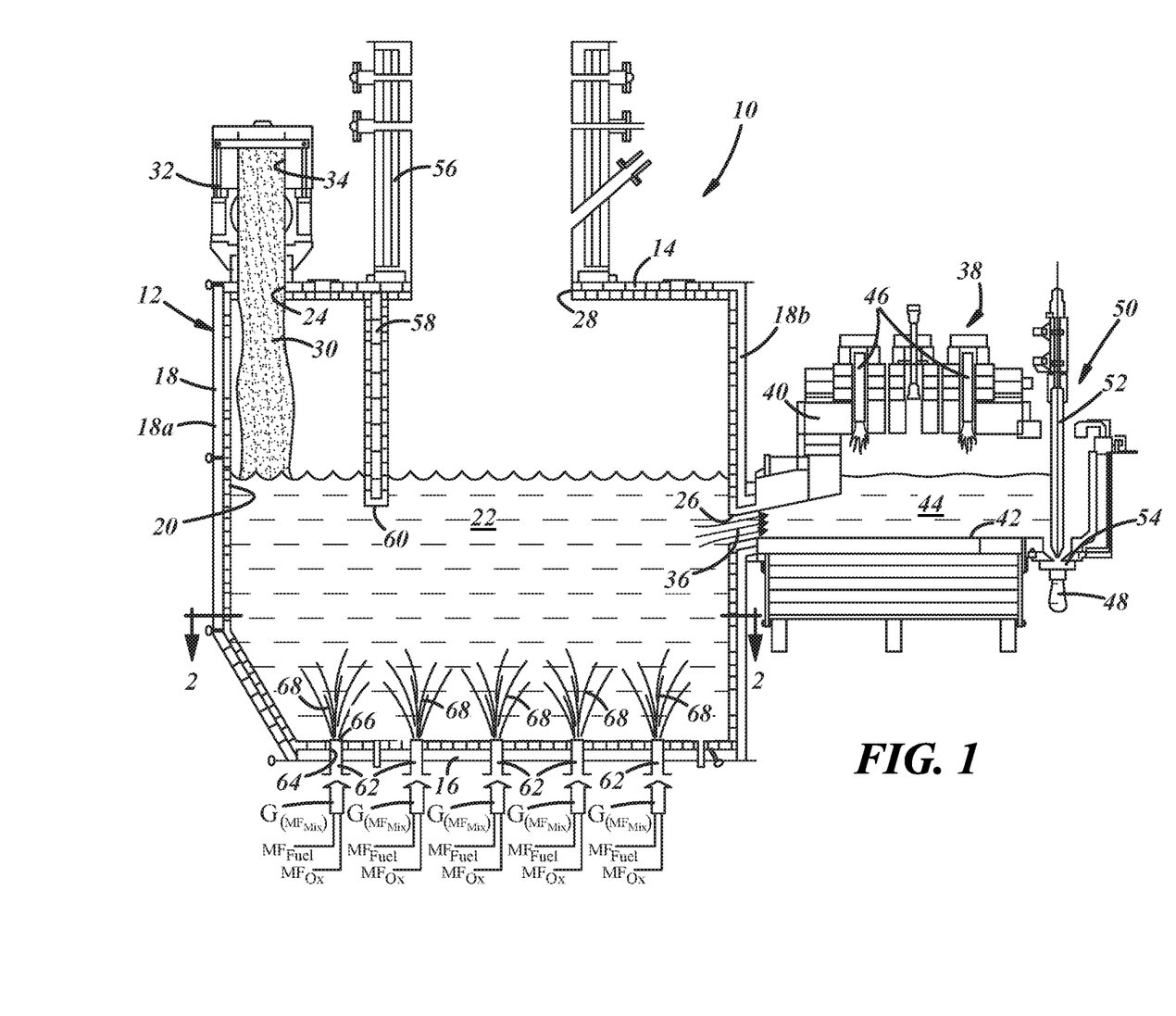
FIG. 1 is an elevational cross-sectional representation of a submerged combustion melter according to one embodiment of the present disclosure.
Figure 2:
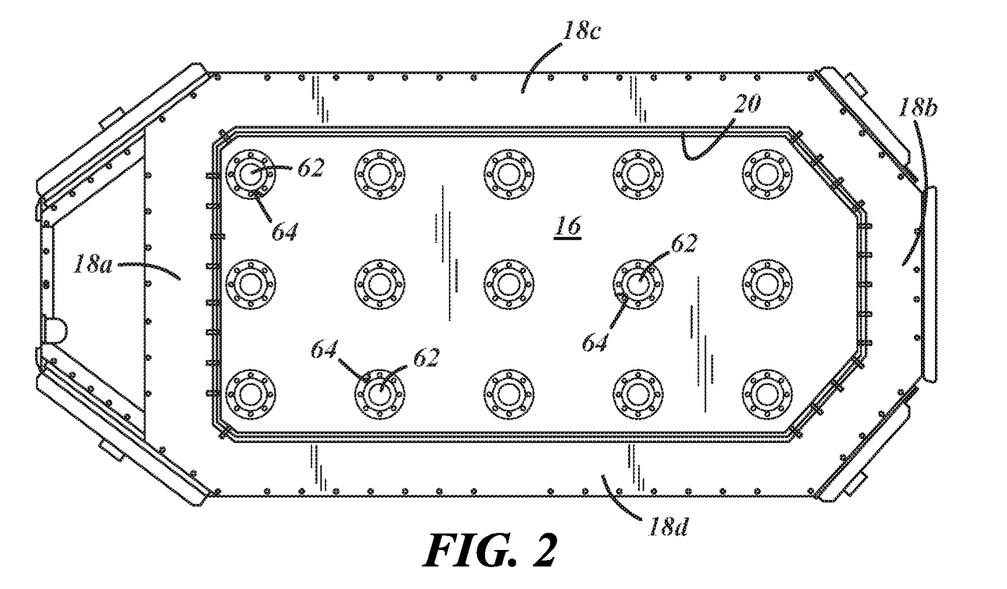
FIG. 2 is a cross-sectional plan view of the submerged combustion melter illustrated in FIG. 1 taken along section line 2-2.

A representative submerged combustion (SC) melter 10 is shown in FIGS. 1-2 to demonstrate the practice of the disclosed method for making glass and controlling the redox ratio of a glass melt 22 produced in the SC melter 10. The SC melter 10 includes a housing 12 that has a roof 14, a floor 16, and a surrounding upstanding wall 18 that connects the roof 14 and the floor 16. The surrounding upstanding wall 18 further includes a front end wall 18a, a rear end wall 18b that opposes and is spaced apart from the front end wall 18a, and two opposed lateral sidewalls 18c, 18d that connect the front end wall 18a and the rear end wall 18b. Together, the roof 14, the floor 16, and the surrounding upstanding wall 18 define an interior reaction chamber 20 of the melter 10 that contains the glass melt 22 when the melter 10 is operational. Each of the roof 14, the floor 16, and the surrounding upstanding wall 18 may be constructed to withstand the high temperature and corrosive nature of the glass melt 22. For example, each of those structures 14, 16, 18 may be constructed from a refractory material or one or more fluid cooled panels that support an interiorly-disposed refractory material having an in-situ formed frozen glass layer (not shown) in contact with the glass melt 22.

The housing 12 of the SC melter 10 defines a feed material inlet 24, a molten glass outlet 26, and an exhaust vent 28. Preferably, as shown best in FIG. 1, the feed material inlet 24 is defined in the roof 14 of the housing 12 proximate the front end wall 18a, and the molten glass outlet 26 is defined in the rear end wall 18b of the housing 12 above the floor 16, although other locations for the feed material inlet 24 and the molten glass outlet 26 are certainly possible. The feed material inlet 24 provides an entrance to the interior reaction chamber 20 for the delivery of a vitrifiable feed material 30. A batch feeder 32 that is configured to introduce a metered amount of the feed material 30 into the interior reaction chamber 20 may be coupled to the housing 12. And while many designs are possible, the batch feeder 32 may, for example, include a rotating screw (not shown) that rotates within a feed tube 34 of a slightly larger diameter that communicates with the feed material inlet 24 to deliver the feed material 30 from a feed hopper into the interior reaction chamber 20 at a controlled rate.

The molten glass outlet 26 provides an exit from the interior reaction chamber 20 for the discharge of foamy molten glass 36 out of the SC melter 10. The discharged foamy molten glass 36 may, as shown, be introduced directly into a stilling vessel 38, if desired. The stilling vessel 38 includes a housing 40 that defines a holding compartment 42. The holding compartment 42 receives the foamy molten glass 36 that is discharged from the interior reaction chamber 20 of the SC melter 10 through the molten glass outlet 26 and maintains an intermediate pool 44 of the molten glass having a constant steady volume (i.e., ±5 vol %). One or more impingement or non-impingement burners 46 may be mounted in the housing 40 of the stilling vessel 38 to heat the intermediate pool 44 of molten glass and/or suppress or destroy any foam that may accumulate on top of the pool 44 of molten glass. A constant or intermittent flow 48 of molten glass may be dispensed from the intermediate pool 44 of molten glass maintained in the holding compartment 42 and out of the stilling vessel 38 by a spout 50 appended to the housing 40. The spout 50 may have a reciprocal plunger 52 that is operable to controllably dispense the flow 48 of molten glass through an orifice plate 54 so that any downstream equipment, such as a glass finer, can receive a controlled input of molten glass. A more complete description of a stilling vessel that may receive the discharged foamy molten glass 36 is disclosed in U.S. Pub. No. 2021/0094857 (U.S. application Ser. No. 16/590,068), which is assigned to the assignee of the present invention and is incorporated herein by reference in its entirety. Of course, in other embodiments, the stilling vessel 38 may be omitted and the foamy molten glass 36 discharged from the interior reaction chamber 20 of the SC melter 10 may be introduced directly into a glass finer or elsewhere.

The exhaust vent 28 is preferably defined in the roof 14 of the housing 12 between the front end wall 18a and the rear end wall 18b at a location downstream from the feed material inlet 24. An exhaust duct 56 communicates with the exhaust vent 28 and is configured to remove gaseous compounds from the interior reaction chamber 20. The gaseous compounds removed through the exhaust duct 56 may be treated, recycled, or otherwise managed away from the SC melter 10 as needed. To help prevent or at least minimize the loss of some of the feed material 30 through the exhaust vent 28 as unintentional feed material castoff, a partition wall 58 that depends from the roof 14 of the housing 12 may be positioned between the feed material inlet 24 and the exhaust vent 28. The partition wall 58 may include a lower free end 60 that is submerged within the glass melt 22, as illustrated, or it may be positioned close to, but above, the glass melt 22. The partition wall 58 may be constructed similarly to the roof 14, the floor 16, and the surrounding upstanding wall 18, but it does not necessarily have to be so constructed.

The SC melter 10 includes one or more submerged burners 62. Each of the one or more submerged burners 62 is mounted in a port 64 defined in the floor 14 (as shown) and/or the surrounding upstanding wall 18 at a location immersed by the glass melt 22. Each of the submerged burner(s) 62 forcibly injects a combustible gas mixture G into the glass melt 22 through an output nozzle 66. The combustible gas mixture G comprises fuel and oxygen. The fuel supplied to the submerged burner(s) 62 is preferably methane or propane, and the oxygen may be supplied as pure oxygen, in which case the burner(s) 62 are oxy-fuel burners, or it may be supplied as a component of air or an oxygen-enriched gas that includes at least 20 vol % and, preferably, at least 50 vol % $O_2$. Upon being injected into the glass melt 22, the combustible gas mixture G immediately autoignites to produce combustion products 68—namely, $CO_2$, CO, $H_2O$, and any uncombusted fuel, oxygen, and/or other gas compounds such as nitrogen—that are discharged into and through the glass melt 22. Anywhere from five to thirty submerged burners 62 are typically installed in the SC melter 10 although more or less burners 62 may certainly be employed depending on the size and melt capacity of the melter 10.

The combustible gas mixture G is supplied to and injected from each of the submerged burner(s) 62 at a mass flow rate $MF_{mix}$. The mass flow rate $MF_{Mix}$ of the combustible gas mixture G at each burner 62 comprises a mass flow rate of oxygen $MF_{Ox}$ and a mass flow rate of fuel $MF_{Fuel}$, which may be a mass flow rate of methane $MF_{Meth}$ or a mass flow rate of propane $MF_{Prop}$, plus mass flow rates of other gases such as nitrogen or another inert gas if the oxygen is supplied via air or an oxygen-enriched gas. In terms of supplying the submerged burner(s) 62 with the combustible gas mixture G at the appropriate overall mass flow rate $MF_{Mix}$ as well as the appropriate mixture of oxygen and fuel flow rates $MF_{Ox}$, $MF_{Fuel}$, each of the burner(s) 62 may be fluidly coupled to an oxidant (oxygen, oxygen-enriched gas, or air) supply manifold and a fuel supply manifold by a flow conduit that is equipped with sensors and valves to allow for precise control of the mass flow rates $MF_{Mix}$, $MF_{Ox}$, $MF_{Fuel}$ to the burner(s) 62 and injected through the burner nozzle(s) 66. While the these mass flow rates $MF_{mix}$, $MF_{Ox}$, $MF_{Fuel}$ may vary depending on numerous factors—including the number of submerged burners 62, the weight of the glass melt 22, and the flow rate of the foamy molten glass 36 through he molten glass outlet 26—in many instances the mass flow rate $MF_{Mix}$ of the combustible gas mixture G at each burner 62 ranges from 22 kg/hr to 280 kg/hr (approximately 20 normal cubic feet per hour (NCFH) to 175 NCFH) with the mass flow rate of oxygen $MF_{Ox}$ ranging from 20 kg/hr to 180 kg/hr (approximately 16 NCFH to 125 NCFH) and the mass flow rate of fuel $MF_{Fuel}$ ranging from 2 kg/hr to 40 kg/hr for methane or 5 kg/hr to 100 kg/hr for propane (approximately 4 NCFH to 50 NCFH) as part of the mass flow rate $MF_{Mix}$ of the combustible gas mixture G.

During operation of the SC melter 10, each of the one or more submerged burners 62 individually discharges combustion products 68 directly into and through the glass melt 22. The glass melt 22 is a volume of molten glass that often weighs between 1 US ton (1 US ton=2,000 lbs) and 100 US tons and is generally maintained at a constant volume during steady-state operation of the SC melter 10. As the combustion products 68 are thrust into and through the glass melt 22, which creates complex flow patterns and severe turbulence, the glass melt 22 is vigorously agitated and experiences rapid heat transfer and intense shearing forces. The combustion products 68 eventually escape the glass melt 22 and are removed from the interior reaction chamber 20 through the exhaust vent 28 along with any other gaseous compounds that may volatize out of the glass melt 22. Additionally, in some circumstances, one or more non-submerged burners (not shown) may be mounted in the roof 14 and/or the surrounding upstanding wall 18 at a location above the glass melt 22 to provide heat to the glass melt 22, either directly by flame impingement or indirectly through radiant heat transfer, and to also facilitate foam suppression and/or destruction.

While the one or more submerged burners 62 are being fired into the glass melt 22, the vitrifiable feed material 30 is controllably introduced into the interior reaction chamber 20 through the feed material inlet 24. The vitrifiable feed material 30 introduced into the interior reaction chamber 20 has a composition that is formulated to assimilate into the glass melt 22 and provide the melt 22 with a predetermined glass chemical composition upon melting. For example, the glass chemical composition of the glass melt 22 may be a soda-lime-silica glass chemical composition, in which case the vitrifiable feed material 30 may be a physical mixture of virgin raw materials and optionally cullet (i.e., recycled glass) that provides a source of $SiO_2$, $Na_2O$, and CaO in the correct proportions along with any of the other materials listed below in Table 1 including, most commonly, $Al_2O_3$. The exact constituent materials that constitute the vitrifiable feed material 30 is subject to much variation while still being able to achieve the soda-lime-silica glass chemical composition as is generally well known in the glass manufacturing industry.

TABLE 1

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

For example, to achieve a soda-lime-silica glass chemical composition in the glass melt 22, the feed material 30 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 30 to contribute one or more of $SiO_2$, $Na_2O$, CaO and possibly other oxide and/or non-oxide materials in the glass melt 22 depending on the desired chemistry of the soda-lime-silica glass chemical composition and the color of the glass articles being formed therefrom. These other virgin raw materials may include feldspar, dolomite, and calumite slag. Additionally, the vitrifiable feed material 30 may include secondary or minor virgin raw materials that provide the soda-lime-silica glass chemical composition with colorants, decolorants, and/or redox agents that may be needed, and may further provide a source of chemical fining agents to assist with downstream bubble removal. The vitrifiable feed material 30 may even include up to 80 wt % cullet depending on a variety of factors.

The vitrifiable feed material 30 does not form a batch blanket that rests on top of the glass melt 22 as is customary in a conventional continuous melting furnace, but, rather, is rapidly disbanded and consumed by the turbulent glass melt 22. The dispersed vitrifiable feed material 30 is subjected to intense heat transfer and rapid particle dissolution throughout the glass melt 22 due to the vigorous melt agitation and shearing forces caused by the submerged burner(s) 62. This causes the feed material 30 to quickly mix, react, and become chemically integrated into the glass melt 22. However, the agitation and stirring of the glass melt 22 by the discharge of the combustion products 68 from the submerged burner(s) 62 also promotes bubble formation within the glass melt 22. Consequently, the glass melt 22 is foamy in nature and includes a homogeneous distribution of entrained gas bubbles. The entrained gas bubbles may account for 30 vol % to 60 vol % of the glass melt 22, which renders the density of the glass melt 22 relatively low, typically ranging from 0.75 gm/cm$^3$ to 1.5 gm/cm$^3$ or, more narrowly, from 0.99 gm/cm$^3$ to 1.3 gm/cm$^3$, for soda-lime-silica glass. The gaseous inclusions entrained within the glass melt 22 vary in size and may contain any of several gases including $CO_2$, $H_2O$ (vapor), $N_2$, $SO_2$, $CH_4$, CO, and volatile organic compounds (VOCs).

The foamy molten glass 36 discharged from the SC melter 10 through the molten glass outlet 26 is drawn from the glass melt 22 and is chemically homogenized to the desired glass chemical composition, e.g., a soda-lime-silica glass chemical composition, but with the same relatively low density and entrained volume of gas bubbles as the glass melt 22.

The foamy molten glass 36 is eventually directed to additional downstream equipment—with or without first being collected in the holding compartment 42 of the stilling vessel 38—such as an individual section forming machine as applicable to glass containers for additional processing into glass articles. Depending on the desired characteristics of the glass articles to be formed, most notably the color of the glass, the glass melt 22 and the foamy molten glass 36 drawn from the glass melt 22 may be required to have a redox ratio within a certain defined range. When producing flint or colorless glass, for example, the redox ratio of the glass melt 22 may be required to be 0.4 or below. Yet, when producing amber glass, the redox ratio of the glass melt 22 may be required to be between 0.6 and 0.8. Still further, when producing green glass, the redox ratio of the glass melt 22 may be required to be between 0.4 and 0.6. Of course, the chemical composition of the glass melt 22 may include certain colorants or decolorants that work in conjunction with the redox ratio of the glass melt 22 to obtain the desired glass color in the finished glass articles.

Unlike standard procedures for operating a continuous melting furnace, the SC melter 10 may be operated to adjust the redox ratio of the glass melt 22, and, thus, the redox ratio of the foamy molten glass 36 discharged through the molten glass outlet 26 since that flow of foamy molten glass is pulled directly from the glass melt 22. The redox ratio of the glass melt 22 may be adjusted by controlling at least one of the following operating conditions of the SC melter 10 without necessarily having to modify the composition of the vitrifiable feed material 30: (1) the oxygen-to-fuel ratio of the combustible gas mixture G injected by each of the one or more submerged burners 62; (2) the residence time of the glass melt 22; or (3) the gas flux through the glass melt 22. Preferably, and in many instances, any combination of two of the three operating conditions, or all three of the operating conditions, may be controlled to adjust the redox ratio of the glass melt 22. The act of adjusting the redox ratio of the glass melt 22 may be performed in several ways. In particular, the redox ratio may be shifted to support the production of glass of a certain color, may be increased or decreased to help transition between the production of glasses that differ in color, or it may be maintained at a target value within a tolerance range when the redox ratio might otherwise deviate, intentionally or unintentionally, as a result of changes to the composition of the vitrifiable feed material 30.

For each of the one or more submerged burners 62, the oxygen-to-fuel ratio of the combustible gas mixture G refers to the ratio of the mass flow rate of oxygen $MF_{Ox}$ (whether that be a flow rate of pure oxygen or a flow rate of oxygen within a gas, such as air, that contains oxygen) to the mass flow rate of fuel $MF_{Fuel}$ within the mass flow rate $MF_{Mix}$ of the combustible gas mixture G relative to stoichiometry, as represented below in equation (1).

$$\text{Oxygen-to-Fuel Ratio} = \frac{MF_{Ox}}{MF_{Fuel}} \qquad \text{Eq. 1}$$

Stoichiometry is defined as the mass flow rate of oxygen $MF_{Ox}$ and the mass flow rate of the fuel $MF_{Fuel}$ that are theoretically needed to fully consume each of the oxygen and fuel flows in the combustion reaction without yielding an excess of either constituent. For example, if methane is used as the fuel, stoichiometry would dictate that the mass flow rate of oxygen $MF_{Ox}$ and the mass flow rate of methane $MF_{Meth}$ as combined in the combustible gas mixture G satisfy the relationship $MF_{Ox}=4.0(MF_{Meth})$. In another example, if propane is used as the fuel, stoichiometry would dictate that the mass flow rate of oxygen $MF_{Ox}$ and the mass flow rate of propane $MF_{Prop}$ as combined in the combustible gas mixture G satisfy the relationship $MF_{Ox}=3.63(MF_{Prop})$. The combustible gas mixture G injected from each of the submerged burners 62 may be at stoichiometry, may contain excess oxygen (lean) relative to stoichiometry, or may contain excess fuel (rich) relative to stoichiometry.

When supplying the submerged burner(s) 62 with excess oxygen or excess fuel, the oxygen-to-fuel ratio may be expressed as a percentage in excess of (or above) stoichiometry. For example, and returning to the examples above, operating the submerged burners 62 at 10% excess oxygen would mean that the mass flow rate of oxygen $MF_{Ox}$ at each of the burners 62 would be $MF_{Ox}=4.4(MF_{Meth})$ when the fuel is methane and $MF_{Ox}=3.99(MF_{Prop})$ when the fuel is propane, while operating the burners 62 with 10% excess fuel would mean that the mass flow rate of oxygen $MF_{Ox}$ at each of the burners 62 would be $MF_{Ox}=3.63(MF_{Meth})$ when the fuel is methane and $MF_{Ox}=3.30(MF_{Prop})$ when the fuel is propane. The oxygen-to-fuel ratio of the combustible gas mixture G supplied to each of the submerged burners 62 can be controlled by adjusting the flow rates of the oxygen and/or the fuel being supplied to the burners 62. Such adjustments can be performed through known automated control systems or by manual action. In general, and depending on the desired redox ratio of the glass melt 22, the oxygen-to-fuel ratio of the combustible gas mixture G injected by each submerged burner 62 may range from 30% excess fuel relative to stoichiometry to 30% excess oxygen relative to stoichiometry.

The oxygen-to-fuel ratio of the combustible gas mixture G at each of the submerged burner(s) 62 can influence the redox ratio of the glass melt 22 by altering the chemistry of the melt 22. If the oxygen-to-fuel ratio of the combustible gas mixture G being injected by the submerged burner(s) 62 is at stoichiometry, the combustion products 68 discharged into and through the glass melt 22 contain only $CO_2$ and $H_2O$ (and possibly unreacted inert gases such as $N_2$ if the burner(s) 62 are fed with air) along with no more than a negligible amount of other byproduct compounds. If the oxygen-to-fuel ratio is increased to above stoichiometry, excess oxygen will be contained within the combustion products 68 and discharged through the glass melt 22. On the other hand, if the oxygen-to-fuel ratio is decreased to below stoichiometry, excess carbon-rich compounds such as CO, soot, additional fuel, and/or remnants of the fuel will be contained within the combustion products 68 and discharged through the glass melt 22. Because the combustion products 68 discharged from each submerged burner 62 transfer heat and momentum to the glass melt 22 through intimate shearing contact, a change in the composition of the combustion products 68 initiated through change in the oxygen-to-fuel ratio of the combustible gas mixture G fed to the submerged burner(s) 62 can shift the redox ratio of the melt 22.

The oxygen-to-fuel ratio of the combustible gas mixture G and the redox ratio of the glass melt 22 are inversely related. Increasing the oxygen-to-fuel ratio of the combustible gas mixture G injected by the submerged burner(s) 62 has an oxidizing effect on the glass melt 22 and, consequently, decreases the redox ratio of the glass melt 22 by decreasing the amount of $Fe^{2+}$ relative to $F^{3+}$. This is because the excess uncombusted oxygen included in the combustion products 68 is free to react with and neutralize reducing agents in the glass melt 22. The excess oxygen may react with FeO ($F^{2+}$) to form $Fe_2O_3$ ($F^{2+}$), sulfides to form sulfites or sulfates, carbon to form CO and/or $CO_2$, as well as other reducing agents that may be present in the glass melt 22. All of these reactions shift the redox ratio of the glass melt 22 downwards either directly or indirectly. In contrast, decreasing the oxygen-to-fuel ratio of the combustible gas mixture G injected by the submerged burner(s) 62 has a reducing effect on the glass melt 22 and, consequently, increases the redox ratio of the glass melt 22 by decreasing the amount of $Fe^{3+}$ relative to $F^{2+}$. This is because excess carbon-rich compounds included in the combustion products 68 are free to react with and neutralize oxidizing agents in the glass melt 22. The excess carbon-rich compounds may react with $Fe_2O_3$ ($Fe^{3+}$) to form FeO ($F^{2+}$), sulfates to form sulfites or sulfides, and may even extract oxygen out of other compounds in the glass melt 22 to drive combustion of the carbon-rich compounds. All of these reactions shift the redox ratio of the glass melt 22 upwards either directly or indirectly.

The residence time of the glass melt 22 refers to the theoretical average amount of time a unit of weight of the glass melt 22 spends in the interior reaction chamber 22 before being discharged from the SC melter 10 as foamy molten glass 36. The residence time provides a rough indication of how long it takes for a unit of weight of the vitrifiable feed material 30 to become chemically integrated into and cycle through the glass melt 22 starting from the time the unit of feed material is introduced into the interior reaction chamber 20 to the time the unit of feed material unit is discharged from the chamber 20 as an equivalent unit of foamy molten glass. To calculate the residence time of the glass melt 22, the weight of the glass melt 22 ($W_{Glass\ Melt}$) contained within the interior reaction chamber 20 is divided by the mass flow rate of the foamy molten glass 36 being discharged through the molten glass outlet 26 ($MF_{Discharged\ Glass}$) as represented below in equation (2).

$$\text{Residence Time} = \frac{W_{Glass\ Melt}}{MF_{Discharge\ Glass}} \quad \text{Eq. 2}$$

The residence time of the glass melt 22 can be adjusted by increasing or decreasing the mass flow rate of the foamy molten glass 36 being discharged from the SC melter 10 and/or by increasing or decreasing the weight the glass melt 22 contained in the interior reaction chamber 20. In general, and depending on the desired redox ratio of the glass melt 22, the residence time of the glass melt 22 may range from 1 hour to 12 hours or, more narrowly, from 1.5 hours to 8 hours or from 2 hours to 6 hours.

The residence time of the glass melt 22 can influence the redox ratio of the glass melt 22 by affecting the volatilization of volatile compounds in the melt 22. Molten glass in general contains a number of volatile compounds including, most notably, sulfates, which volatize into gases over time. The volatization typically occurs at melt/gas interfaces. To that end, in a conventional continuous melting furnace, most of the volatization of volatile compounds occurs at the surface of the molten glass bath or in the immediate vicinity of bubbles contained in the glass bath as a result of trapped air or reactions involving the feed material. The volatilization mechanism is much different and much more rapid in submerged combustion melting. Not only are the combustion products 68 discharged from the submerged burner(s) 62 fired directly into and through the glass melt 22, but the amount of bubbles entrained within the glass melt 22 is much greater compared to a molten glass bath in a conventional continuous melting furnace. As a result, the volatilization of volatile compounds occurs more rapidly in the glass melt 22 of the SC melter 10 than in a conventional continuous melting furnace and is much more sensitive to changes in residence time.

The residence time of the glass melt 22 is directly proportional to the extent of volatilization of any volatile compounds, particularly sulfates, that are contained in the glass melt 22. When the residence time is increased, the extent of volatilization of the volatile compounds increases, and less of the volatile compounds are retained in the glass melt 22 and the glass produced therefrom. In the case of sulfates, for instance, an increase in the residence time of the glass melt 22 causes increased volatilization of the sulfates and, consequently, a decrease in the amount of retained sulfates, expressed as $SO_3$, in the glass melt 22. And since $SO_3$ acts as an oxidizing agent, a decrease in the amount of retained sulfates in the glass melt 22 renders the melt 22 more reduced and thus increases the redox ratio of the melt 22. Conversely, when the residence time is decreased, the extent of volatilization of the volatile compounds decreases, and more of the volatile compounds are retained in the glass melt and the glass produced therefrom. Referring again to the case of sulfates, a decrease in the residence time of the glass melt causes reduced volatilization of the sulfates and, consequently, an increase in the amount of retained sulfates in the glass melt. This renders the glass melt 22 more oxidized and thus decreases the redox ratio of the melt 22.

The gas flux through the glass melt 22 refers to the volumetric flow rate of the combustion products 68 discharged through the glass melt 22 taking into account the discharge rate ($MF_{Discharged\ Glass}$) of the foamy molten glass 36 from the SC melter 10. To calculate the gas flux through the glass melt 22, the sum of the volumetric flow rates ($VF_{Comb}$) of the combustion products 68 from the submerged burners 62 is divided by the product of the weight of the glass melt 22 ($W_{Glass\ Melt}$) and the residence time ($RT_{Glass\ Melt}$) of the glass melt 22 as represented below in equation (3). The sum of the volumetric flow rates ($VF_{Comb}$) of the combustion products 68 discharged from the submerged burners 62 can be calculated by (i) obtaining the molar flow rate of the combustible gas mixture G supplied to each of the burners 62 (derived from the mass flow rate $MF_{Mix}$ of the combustible gas mixture G supplied to each of the burners 62 or the corresponding volumetric flow rate), (ii) converting the molar flow rate of the combustible gas mixture G supplied to each of the burners 62 to a molar flow rate of the combustion products 68 discharged from each of the burners 62 as determined from the known combustion reaction, (iii) converting the molar flow rate of the combustion products 68 discharged from each of the burners 62 to the volumetric flow rate $VF_{Comb}$ of the combustion products 68 discharged from each of the burners 62 using the Ideal Gas Law, and (iv) summing the volumetric flow rates $VF_{Comb}$ together.

$$\text{Gas Flux through the Glass Melt} = \frac{\sum VF_{Comb}}{(W_{Glass\ Melt})(RT_{Glass\ Melt})} \quad \text{Eq. 3}$$

The glass flux through the glass melt 22 can be adjusted, for example, by altering the flow rates of the combustible gas mixture G supplied to the submerged burner(s) 62 while maintaining a constant residence time of the glass melt 22. The residence time of the glass melt 22 may be kept constant when the flow rates of the combustible gas mixture G supplied to the submerged burner(s) 82 are adjusted by simultaneously imposing offsetting adjustments to the weight of the glass melt 22 and/or the flow rate of the foamy molten glass 36 discharged from the molten glass outlet 26 of the SC melter 10. In general, and depending on the desired redox ratio of the glass melt 22, the gas flux through glass melt 22 may range from 0.01 normal cubic meters per kilogram-hour-squared (NCM/kg-hr$^2$) to 0.08 NCM/kg-hr$^2$.

The gas flux through the glass melt 22 can influence the redox ratio of the glass melt 22 by affecting the volatilization of volatile compounds in the glass melt 22, albeit in a slightly different way than the residence time of the glass melt 22. Specifically, as the combustion products 68 discharged from the submerged burners 62 flow through the glass melt 22, volatile compounds are volatized and extracted from the glass melt 22, and less of the volatile compounds are retained in the glass melt 22 and the glass produced therefrom. The gas flux through the glass melt 22 is thus directly proportional to the extent of volatilization of any volatile compounds, particularly sulfates, that are contained in the glass melt 22 since a higher volumetric flow of the combustion products 68 per unit mass of the glass melt 22 will tend to volatilize a higher quantity of volatile compounds. In the case of sulfates, for instance, an increase in the gas flux through the glass melt 22 causes increased volatilization of sulfates and, consequently, a decrease in the amount of retained sulfates, expressed as $SO_3$, in the glass melt 22. This renders the melt 22 more reduced and thus increases the redox ratio of the melt 22. Conversely, a decrease in the gas flux through the glass melt 22 causes reduced volatilization of the sulfates and, consequently, an increase in the amount of retained sulfates in the glass melt. This renders the glass melt 22 more oxidized and thus decreases the redox ratio of the melt 22.

In view of their influence on the redox ratio of the glass melt 22, one or more of the oxygen-to-fuel ratio of the combustible gas mixture G supplied to each of the submerged burners 62, the residence time of the glass melt 22, and the gas flux through the glass melt 22 can be controlled to support the glassmaking operation in numerous ways while minimizing the need to rely on the composition of the vitrifiable feed material 30 to achieve comparable results. Such process flexibility can help render operation of the SC melter 10 more cost and energy efficient, help simplify the operation of the SC melter 10, help expedite the time it takes to convert the color of the glass being produced in the SC melter 10, and help preserve raw materials. Each of the one or more operating conditions of the SC melter 10 can have a tangible impact on the redox ratio of the glass melt 22 specifically because the combustion products 68 discharged from the submerged burner(s) 62 are fired directly into the glass melt 22. Since a conventional continuous melting furnace does not include any such submerged burners, the same methodology would not translate to that traditional melting technology.

In one particular implementation of the presently disclosed method, one, two, or all three of the operating conditions may be controlled to shift the redox ratio to a particular target value based on the color or lack of color in the glass being produced. For example, the redox ratio of the glass melt 22 is preferably less than 0.4 when producing flint glass, and thus it may be appropriate to increase the oxygen-to-fuel ratio of the combustible gas mixture G supplied to the burners 62, decrease the residence time of the glass melt 22, and/or decrease the gas flux through the glass melt 22 to support a correspondingly low redox ratio. By oxidizing the glass melt 22 in this way, the amount of oxidizing agents, such as sulfates, included in the vitrifiable feed material 30 may be reduced since the operating condition(s) are able to perform the same function, which in turn can reduce batch costs, preserve raw materials, and reduce $SO_x$ emissions from the SC melter 10. As another example, the redox ratio of the glass melt 22 is preferably between 0.6 and 0.8 when producing amber glass, and under those circumstances it may be appropriate to decrease the oxygen-to-fuel ratio of the combustible gas mixture G supplied to the burners 62, increase the residence time of the glass melt 22, and/or increase the gas flux through the glass melt 22 to support a correspondingly high redox ratio. Reducing the glass melt 22 in this way can reduce the amount of reducing agents, such as carbon, that need to be included in the feed material 30 since the operating condition(s) are able to perform the same function, thus providing another opportunity to reduce batch costs and preserve raw materials.

In another implementation of the presently-disclosed method, one, two, or all three of the operating conditions may be controlled in a way that enables the SC melter 10 to be operated with more flexibility. Instead of having to modify the composition of the vitrifiable feed material 30 to change the redox ratio of the glass melt 22—which can be relatively slow as the compositional modification of the feed material 30 is not immediately reflected in the glass chemical composition of the melt 22—the oxygen-to-fuel ratio of the combustible gas mixture G supplied to the burners 62, the residence time of the glass melt 22, and/or the gas flux through the glass melt 22 may be controlled to oxidize or reduce the glass melt and therefore decrease or increase the redox ratio as needed to support a change in glass coloration. And changes to any or all of these operating conditions can alter the redox ratio of the glass melt 22 more rapidly compared to modifying the composition of the vitrifiable feed material 30 by adding or removing redox agents. As such, the transitioning of the glass melt 22 within the SC melter 10 from a chemical composition of one color to a chemical composition of another color can occur relatively fast, which minimizes the amount of transition glass that must be recycled or discarded. Additionally, since the redox ratio of the glass melt 22 can be adjusted by controlling the one or more operating conditions of the SC melter 10, the modifications to the vitrifiable feed material 30 that accompany changes in color of the produced glass may be more minimal than in the past and, in some instances, the same composition may be suitable for multiple different colors of glass.

Still further, in yet another implementation of the presently-disclosed method, one, two, or all three of the operating conditions may be controlled to neutralize unwanted deviations in the redox ratio of the glass melt 22 that may transpire as a result of modifying the composition of the vitrifiable feed material 30 to assist other aspects of the glassmaking operations such as, for instance, the ability to fine the foamy molten glass 36 discharged from the SC melter 10. In that regard, a wider range of compositions may be available for the vitrifiable feed material 30 that might not otherwise be possible if the redox ratio is managed solely through the composition of the feed material 30.

Figure 3:
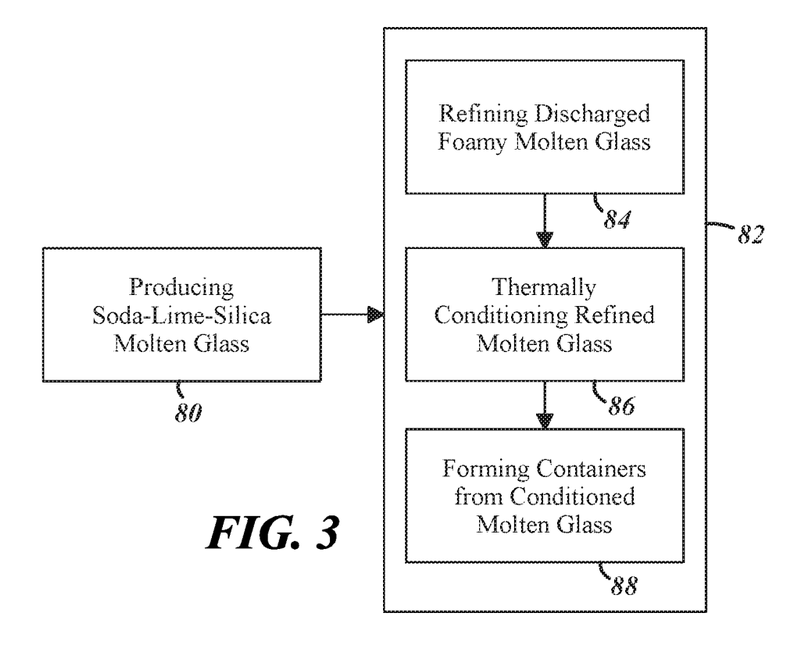
FIG. 3 is a schematic flow diagram of a process for producing molten glass in a submerged combustion melter and then forming glass containers from the molten glass according to one embodiment of the present disclosure.

As mentioned above, the foamy molten glass 36 discharged from the SC melter 10, whatever its color and chemistry, may be further processed downstream of the SC melter 10. For instance, and referring now to FIG. 3, the foamy molten glass 36 may have a soda-lime-silica glass chemical composition and be formed into glass containers. In FIG. 3, the step of producing molten glass having such a chemical composition, step 80, involves the use and operation of the SC melter 10, as described above, to provide the discharged foamy molten glass 36 for further processing, regardless of whether or not the discharged foamy molten glass 36 is temporarily held in the stilling vessel 38 after exiting the SC melter 10. Next, in step 82, the foamy molten glass 36 discharged from the SC melter 10 is formed into at least one, and preferably many, glass containers. The forming step 82 includes a refining step 84, a thermal conditioning step 86, and a forming step 88. These various sub-steps 84, 86, 88 of the forming step 82 can be carried out by any suitable practice including the use of conventional equipment and techniques.

The refining step 84 involves removing bubbles, seeds, and other gaseous inclusions from the foamy molten glass 36 so that the glass containers formed therefrom do not contain more than a commercially-acceptable amount of visual glass imperfections. To carry out such refining, the foamy molten glass 36 may be introduced into a molten glass bath contained within a fining chamber of a finer tank. The molten glass bath flows from an inlet end of the finer tank to an outlet end and is heated along that path by any of a wide variety of burners—most notably, flat flame overhead burners, sidewall pencil burners, overhead impingement burners, etc.—to increase the viscosity of the molten glass bath which, in turn, promotes the ascension and bursting of entrained bubbles. In many cases, the molten glass bath in the fining chamber is heated to a temperature between 1400° C. to 1500° C. Additionally, chemical fining agents, if included in the vitrifiable feed material 30, may further facilitate bubble removal within the molten glass bath. Commonly used fining agents include sulfates that decompose to form $O_2$. The $O_2$ then readily ascends through the molten glass bath collecting smaller entrained bubbles along the way. As a result of the refining process that occurs in the finer tank, the molten glass bath typically has a density that ranges from 2.3 $gm/cm^3$ to 2.5 $gm/cm^3$ for soda-lime-silica glass at the outlet end of the finer tank, thus refining the discharged foamy molten glass 36 into a refined molten glass.

The refined molten glass attained in the fining chamber is then thermally conditioned in the thermal conditioning step 86. This involves cooling the refined molten glass at a controlled rate to a temperature and viscosity suitable for glass forming operations while also achieving a more uniform temperature profile within the refined molten glass. The refined molten glass is preferably cooled to a temperature between 1050° C. to 1200° C. to provide a conditioned molten glass. The thermal conditioning of the refined molten glass may be performed in a separate forehearth that receives the refined molten glass from the outlet end of the finer tank. A forehearth is an elongated structure that defines an extended channel along which overhead and/or sidewall mounted burners can consistently and smoothly reduce the temperature of the flowing refined molten glass. In another embodiment, however, the fining and thermal conditioning steps 84, 86 may be performed in a single structure that can accommodate both fining of the foamy molten glass 36 and thermal conditioning of the refined molten glass.

Glass containers are then formed or molded from the conditioned molten glass in the forming step 88. In a standard container-forming process, the conditioned molten glass is discharged from a glass feeder at the end of the finer/forehearth as molten glass streams or runners. The molten glass runners are sheared into individual gobs of a predetermined weight. Each gob falls into a gob delivery system and is directed into a blank mold of a glass container forming machine. Once in the blank mold, and with its temperature still between 1050° C. and about 1200° C., the molten glass gob is pressed or blown into a parison or preform that includes a tubular wall. The parison is then transferred from the blank mold into a blow mold of the forming machine for final shaping into a container. Once the parison is received in the blow mold, the blow mold is closed and the parison is blown rapidly into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The container formed within the blow mold has an axially closed base and a circumferential wall. The circumferential wall extends from the axially closed base to a mouth that defines an opening to a containment space defined by the axially closed base and the circumferential wall. The formed glass container is allowed to cool while in contact with the mold walls and is then removed from the blow mold and placed on a conveyor or other transport device. The glass container is then reheated and cooled at a controlled rate in an annealing lehr to relax thermally-induced strain and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass chemical composition, which typically falls within the range of 470° C. to 500° C. The glass container may be cooled rapidly after it has been cooled to a temperature below the strain point. Moreover, any of a variety of coatings may be applied to the surface of the glass container either before (hot-end coatings) or after (cold-end coatings) annealing for a variety of reasons.

EXAMPLES

The following Examples are disclosed to demonstrate the impact that the above-described operating conditions of a submerged combustion melter can have on the redox ratio of a glass melt produced within the melter. These Examples do not represent an exhaustive listing of all of the ways in which the operating conditions may be controlled to adjust the redox ratio. Persons skilled in the art of glass manufacturing will understand that myriad opportunities exist for adjusting the redox ratio of the glass melt using one or more of the three operating conditions described herein and will know how to implement a suitable control strategy based on the teachings of the present disclosure. Each of the Examples set forth below have been conducted in the context of producing glass having a soda-lime-silica glass chemical composition suitable for glass container manufacturing. However, the demonstrated results and relationships between the operating conditions and the redox ratio as presented in the Examples are not necessarily limited only to the recited class of glass chemical compositions.

Examples 1-3: Oxygen-to-Fuel Ratio of the Combustible Gas Mixture

Several experiments were performed to demonstrate the effect that the oxygen-to-fuel ratio of the combustible gas mixture suppled to and injected from each of the submerged burners can have on the redox ratio of a glass melt. The experiments, more specifically, were focused on adjusting the redox ratio to favor the production of certain colored glass as well as to impart rapid redox ratio changes to support transitions between different glass color production cycles.

In a first trial (Example 1), a feed material formulated to produce flint glass with 50 wt % flint cullet was introduced into a submerged combustion melter. A glass melt was produced from the feed material and a combustible gas mixture that contained propane as the fuel and pure oxygen was supplied to the submerged burners. The weight of the glass melt, the mass flow rate of foamy molten glass exiting the melter, and the mass flow rates of the combustible gas mixture being injected by the submerged burners were each held constant. Additionally, the foamy molten glass discharged from the submerged combustion melter was directed through a forehearth to refine and thermally condition the molten glass. The molten glass exiting the forehearth was collected at various times to determine the redox ratio of the glass, which for all practical purposes should be the same as the redox ratio of the glass melt.

Figure 4:
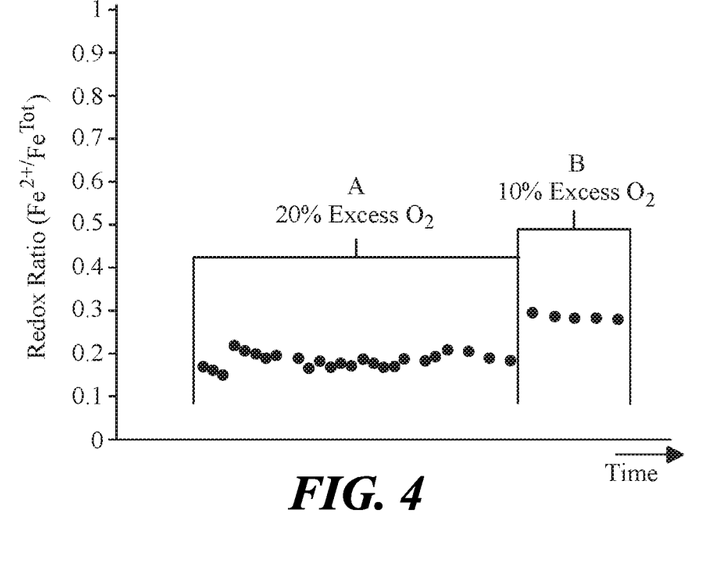
FIG. 4 is a plot of redox ratios of various samples of a glass melt (produced from a vitrifiable feed material formulated for flint glass) showing how the redox ratio of the glass melt was affected by changing the oxygen-to-fuel ratio of the combustible gas mixture supplied to each of the submerged burners.

The redox ratio of each evaluated sample of molten glass is plotted in FIG. 4. During period A, the combustible gas mixture supplied to the submerged burners contained 20% excess oxygen relative to stoichiometry (i.e., an oxygen-to-fuel ratio of 4.36 for propane). The redox ratio of the glass melt had an average value of 0.19 over period A. To illustrate the effect that the oxygen-to-fuel ratio of the combustible gas mixture can have on the redox ratio, the oxygen-to-fuel ratio of the combustible base mixture supplied to the combustion burners was decreased to 10% excess oxygen relative to stoichiometry (i.e., an oxygen-to-fuel ratio of 3.99 for propane) during period B following period A. The downward adjustment in the oxygen-to-fuel ratio shifted the glass to a more reducing state and, as shown, caused an increase in the average value of the redox ratio of the glass melt to 0.3 over period B. Should it be desired to decrease the redox ratio back to the average value observed in period A while maintaining the oxygen-to-fuel ratio employed in period B, additional oxidizing agents (e.g., sulfates) would have to be added to the feed material.

In a second trial (Example 2), a feed material formulated to produce amber glass with 50 wt % amber cullet was introduced into a submerged combustion melter. A glass melt was produced from the feed material and a combustible gas mixture that contained propane as the fuel and pure oxygen was supplied to the submerged burners. The weight of the glass melt, the mass flow rate of foamy molten glass exiting the melter, and the mass flow rates of the combustible gas mixture being injected by the submerged burners were each held constant. Additionally, like before, the foamy molten glass discharged from the submerged combustion melter was directed through a forehearth to refine and thermally condition the molten glass. The molten glass exiting the forehearth was collected at various times to determine the redox ratio of the glass and thus the redox ratio of the glass melt.

Figure 5:
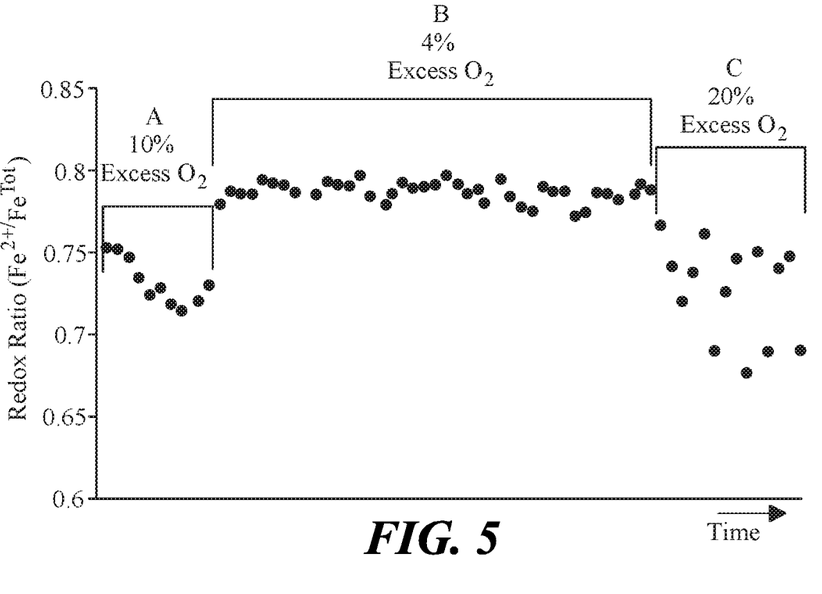
FIG. 5 is a plot of redox ratios of various samples of a glass melt (produced from a vitrifiable feed material formulated for amber glass) showing how the redox ratio of the glass melt was affected by changing the oxygen-to-fuel ratio of the combustible gas mixture supplied to each of the submerged burners.

The redox ratio of each evaluated sample of molten glass is plotted in FIG. 5. Here, the oxygen-to-fuel ratio of the combustible gas mixture was varied from 10% excess oxygen relative to stoichiometry (i.e., an oxygen-to-fuel ratio of 3.99 for propane) during period A, to 4% excess oxygen relative to stoichiometry (i.e., an oxygen-to-fuel ratio of 3.78 for propane) during period B following period A, and finally to 20% excess oxygen relative to stoichiometry (i.e., an oxygen-to-fuel ratio of 4.36 for propane) during period C following period B. As shown, the average value of the redox ratio of the glass melt was greatest during period B (~0.78), while the increased oxygen-to-fuel ratio achieved in periods A and C shifted the glass melt to a more oxidized state and caused a corresponding decrease in the redox ratio. As a result of these variations in the redox ratio, a light amber color was achieved for the molten glass during period B, but when higher oxygen-to-fuel ratios were employed during periods A and C, most of the expected amber color was not present.

In a third trial (Example 3), the ability to induce rapid changes in the redox ratio of the glass melt was investigated. This trial involved melting a feed material formulated to produce flint glass in a submerged combustion melter. A glass melt was produced from the feed material and a combustible gas mixture that contained methane as the fuel and pure oxygen was supplied to the submerged burners. At no point during the entirety of the trial were any changes made to the composition of the feed material. The foamy molten glass discharged from the submerged combustion melter was again directed through a forehearth to refine and thermally condition the molten glass. The molten glass exiting the forehearth was collected at various times to determine the redox ratio of the glass and thus the redox ratio of the glass melt.

Figure 6:
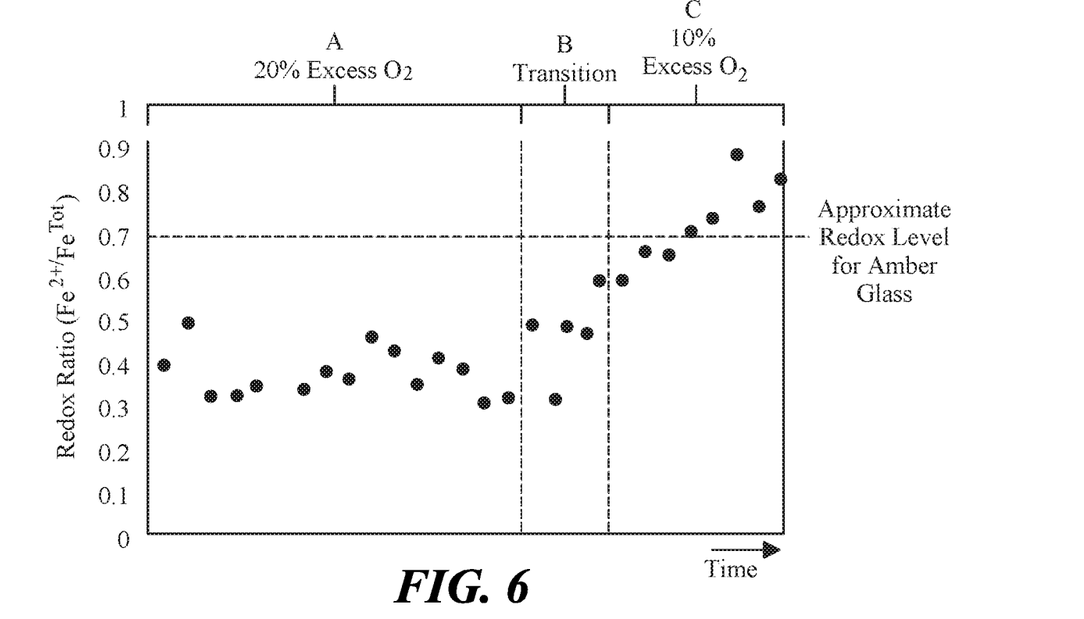
FIG. 6 is a plot of redox ratios of various samples of a glass melt (produced from a vitrifiable feed material formulated for flint glass) showing how the redox ratio of the glass melt was affected when transitioning the oxygen-to-fuel ratio of the combustible gas mixture supplied to each of the submerged burners from a higher ratio to a lower ratio.

As shown in FIG. 6, in which the redox ratios of the evaluated samples are plotted, the oxygen-to-fuel ratio of the combustible gas mixture supplied to each of the submerged burners was varied over three consecutive periods. At the beginning of the trial, in period A, the combustible gas mixture supplied to the submerged burners contained 20% excess oxygen relative to stoichiometry (i.e., an oxygen-to-fuel ratio of 4.8 for methane). This resulted in a redox ratio between 0.3 and 0.5 near the level typically used for flint glass. Next, during period B, the oxygen-to-fuel ratio of the combustible gas mixture was decreased in steps over an eight-hour period until it reached 10% excess oxygen relative to stoichiometry (i.e., an oxygen-to-fuel ratio of 4.4 for methane). The combustible gas mixture suppled to the submerged burners was then held at 10% excess oxygen relative to stoichiometry during period C. In response to the downward adjustment in the oxygen-to-fuel ratio, the redox ratio of the glass melt changed significantly from periods A to C, eventually exceeding 0.8 in period C and surpassing the range typically used for amber glass. It is believed that such a change in the redox ratio of the glass melt could have been achieved even quicker had the oxygen-to-fuel ratio been directly adjusted from 20% excess oxygen to 10% excess oxygen relative to stoichiometry instead of making that transition over an eight-hour period.

Figure 7:
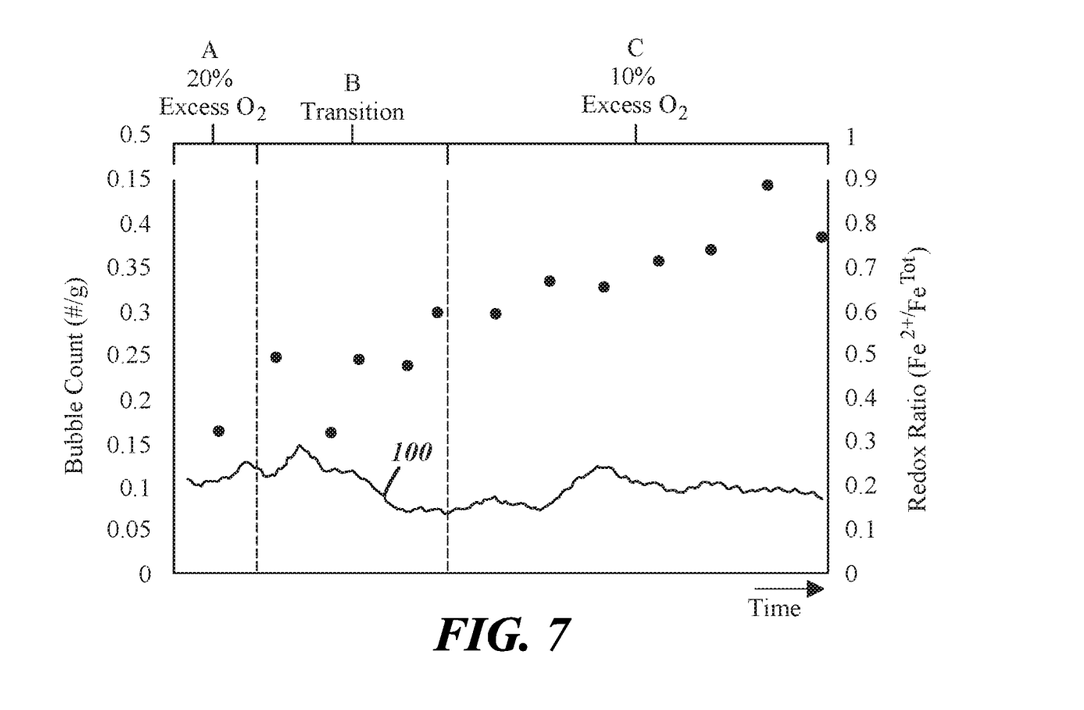
FIG. 7 is a plot of redox ratios for a portion of samples plotted in FIG. 6 as well as the bubble count of the glass melt over the same timeframe during which the oxygen-to-fuel ratio of the combustible gas mixture supplied to each of the submerged burners was transitioned from a higher ratio to a lower ratio.

Moreover, as shown in FIG. 7, which graphically depicts the bubble count (identified by reference numeral 100) corresponding to the redox ratios for a portion of the samples spanning periods A to C in FIG. 6, the change in redox ratio of the glass melt by adjustment of the oxygen-to-fuel ratio of the combustible gas mixture did not adversely affect the quality of the glass. As illustrated in FIG. 7, the bubble count 100 observed in the molten glass remained essentially unchanged when progressing from period A to period B to period C and well below the common target value of 0.5 bubbles per gram of glass. Without being bound be theory, the reason that the bubble count remained unchanged during the change in redox ratio is believed to be related to the nature of submerged combustion melting. The fact that significant bubbles are formed in the glass melt as a result of discharging combustion products directly into the melt, plus the turbulent mixing that occurs in the melt, likely nullifies any impact a sudden change in the redox ratio of the glass melt might have on glass bubble count. This is much different than in a conventional continuous melting furnace where changes in the redox ratio of the more settled molten glass bath have to be implemented slowly by gradually altering the sulfate or carbon concentrations in the feed material being introduced into the furnace. If changes to the feed material are implemented too quickly, a significant amount of foam will be generated in the furnace due to reactions between sulfates, carbon, and molten glass as the redox ratio changes, and as a result glass quality may suffer noticeably.

As expressed in the data shown in FIGS. 6 and 7, the oxygen-to-fuel ratio of the combustible gas mixture supplied to each of the submerged burners can be adjusted to induce rapid redox ratio changes in the glass melt and, thus, support glass coloration changeovers while minimizing the amount of transition glass produced. For example, when a submerged combustion melter is scheduled to switch from producing amber glass (a reduced glass) to producing emerald green glass (an oxidized glass), two primary actions are usually taken: (1) the redox ratio of the glass melt is lowered from 0.6-0.8 to 0.4-06 and (2) the composition of the feed material is modified to increase its chromium content. As soon as it has been determined that the feed material as formulated for emerald green glass (due to the chromium addition) is being fed to the melter, the change in the redox ratio can be attained relatively quickly by increasing the oxygen-to-fuel ratio of the combustible gas mixture supplied to the submerged burners without having to add sulfates to the composition of the feed material. To that end, the change in chromium content of the glass melt is the rate-limiting step when converting glass colors in this example, as opposed to the operation a conventional continuous melting furnace where a redox ratio change is usually the rate-limiting step since, as explained above, redox ratio changes must be carried out slowly to avoid any deterioration in glass quality.

Examples 4-5: Residence Time of the Glass Melt

Several experiments were performed to demonstrate the effect that the residence time of the glass melt can have on the redox ratio of a glass melt due to changes in sulfate volatilization. In a first trial (Example 4), a feed material formulated to produce flint glass with 50 wt % flint cullet was introduced into a submerged combustion melter. A glass melt was produced from the feed material and a combustible gas mixture that contained propane as the fuel and pure oxygen was supplied to the submerged burners. The mass flow rate of foamy molten glass out of the melter was varied from 1200 pounds per hour (lbs/hr) initially, to 600 lb/hr, and was then increased again to vary the residence time of the glass melt. The weight of the glass melt was held constant and no changes were made to the composition of the feed material or to any other process parameter that would affect the redox ratio during the trial. The foamy molten glass discharged from the submerged combustion melter was directed through a forehearth to refine and thermally condition the molten glass. The molten glass exiting the forehearth was collected at various times to determine the redox ratio of the glass, and thus the redox ratio of the glass melt, as well as the retained sulfates in the glass as expressed as $SO_3$.

Figure 8:
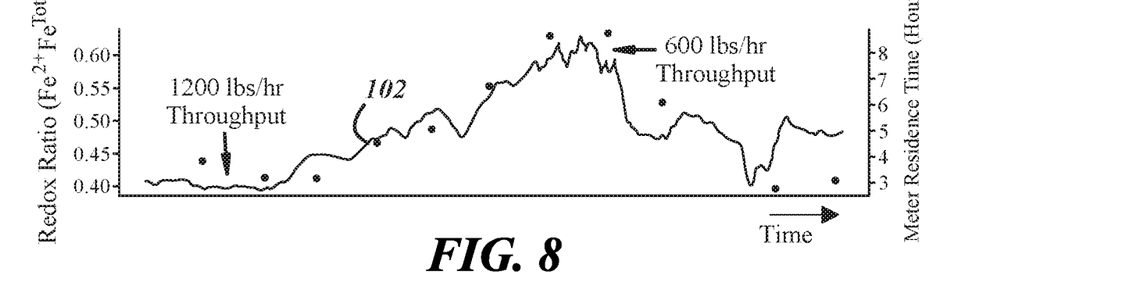
FIG. 8 is a plot of redox ratios for various samples of a glass melt (produced from a vitrifiable feed material formulated for flint glass) as well as the residence time of the glass melt during the timeframe in which the samples were taken, wherein the residence time was varied by altering the mass flow rate of molten glass exiting the submerged combustion melter.
Figure 9:
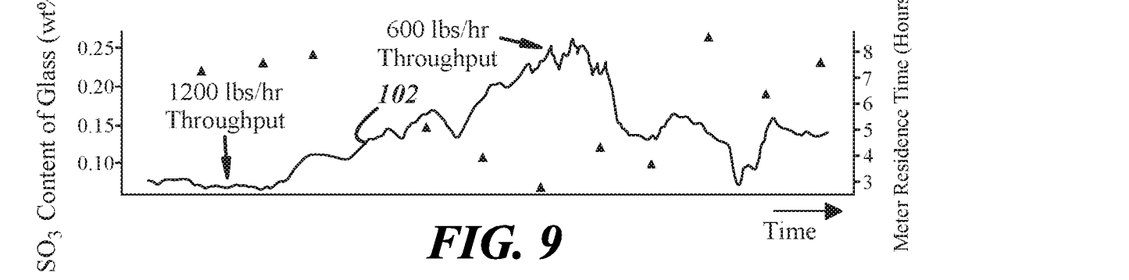
FIG. 9 is a plot of retained sulfate content (expressed as $SO_3$) for the same samples evaluated in FIG. 8 as well as the residence time of the glass melt during the timeframe in which the samples were taken.

The redox ratio and the retained sulfate content of each evaluated sample is plotted in FIG. 8 and FIG. 9, respectively, in conjunction with the residence time of the glass melt (identified by reference numeral 102). In FIG. 8, the circles represent the redox ratios of the glass samples, while in FIG. 9 the triangles represent the retained sulfates in the glass samples. Referring to FIG. 8, it can be seen that decreasing the mass flow rate of the foamy molten glass exiting the melter from 1200 lbs/hr to 600 lbs/hr caused the residence time 102 of the glass melt to increase, which in turn caused the redox ratio of the glass melt to increase by up to 50% as the melt became more reduced. The reason behind the increase in the redox ratio is apparent from FIG. 9, which shows the retained sulfate content of the glass decreased as the residence time 102 of the glass melt increased over the same period. Retaining less sulfates in the glass (because more sulfates are volatized when the residence time is increased) causes an increase in the redox ratio since sulfates act as oxidizing agents. When the mass flow rate of the foamy molten glass exiting the melter was later increased from 600 lbs/hr, the residence time 102 of the glass melt decreased and the redox ratio of the melt also decreased due to a greater quantity of retained sulfates in the glass.

Figure 10:
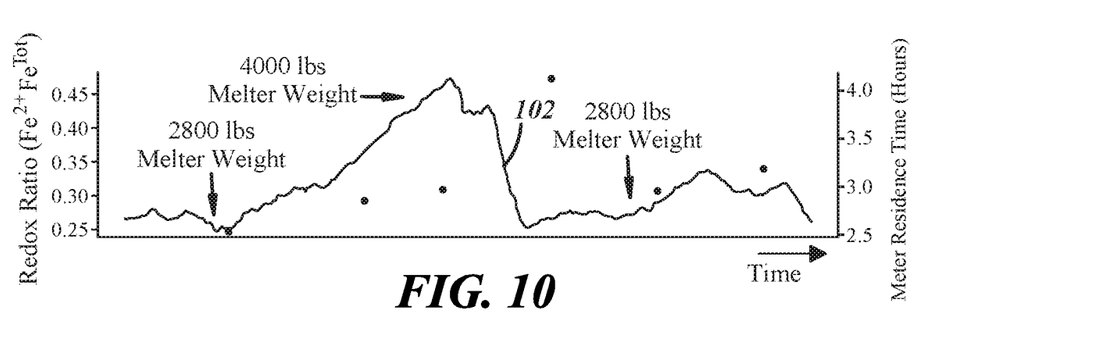
FIG. 10 is a plot of redox ratios for various samples of a glass melt (produced from a vitrifiable feed material formulated for flint glass) as well as the residence time of the glass melt during the timeframe in which the samples were taken, wherein the residence time was varied by altering the weight of the glass melt in the submerged combustion melter.

In a second trial (Example 5), a feed material formulated to produce flint glass with 50 wt % flint cullet was introduced into a submerged combustion melter. A glass melt was produced from the feed material and a combustible gas mixture that contained propane as the fuel and pure oxygen was supplied to the submerged burners. Here, the weight of the glass melt in the submerged combustion melter was varied from 2800 lbs to 4000 lbs and back to 2800 lbs to vary the residence time of the glass melt. The mass flow rate of foamy molten glass out of the melter was kept constant and no changes were made to the composition of the feed material or to any other process parameter that would affect the redox ratio during the trial. The foamy molten glass discharged from the submerged combustion melter was again directed through a forehearth to refine and thermally condition the molten glass. The molten glass exiting the forehearth was collected at various times to determine the redox ratio of the glass and thus the redox ratio of the glass melt. As can be seen in FIG. 10, in which the redox ratio of each evaluated sample is plotted in conjunction with the residence time of the glass melt (identified by reference numeral 102), decreasing the residence time of the glass melt caused the redox ratio of the melt to increase, and vice versa, for the same general reasons pertaining to sulfate retention in the glass as discussed above in connection with FIGS. 8 and 9.

Based on the above data, the residence time of the glass melt can be used much like the oxygen-to-fuel ratio of the combustible gas mixture to help optimize the glassmaking operation. Indeed, adjustments to the residence time of the glass melt can be implemented without having to modify the composition of the feed material by adding or removing redox agents; rather, the mass flow rate of the foamy molten glass being discharged from the melter and/or the weight of the glass melt can be adjusted quite rapidly, usually in as little as a few hours. To that end, the residence time of the glass melt may be tailored to the desired redox ratio based on the color of the glass being produced. For instance, when producing a reduced glass such as amber glass, the residence time of the glass melt may be increased to drive the glass to a more reduced state. This could reduce the need to include carbon and/or other reducing agents in the feed material that might otherwise be needed to reduce the glass melt. Conversely, when producing an oxidized glass such as flint glass, the residence time of the glass melt may be decreased to drive the glass to a more oxidized state. This could reduce the need to include sulfates and/or other oxidizing agents in the feed material that might otherwise be needed to oxidize the glass melt.

A method of producing molten glass using submerged combustion melting technology has thus been disclosed that satisfies one or more of the objects and aims previously set forth in the disclosure. The molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing glass using submerged combustion melting, the method comprising:
   introducing a vitrifiable feed material directly into a glass melt contained within a submerged combustion melter, the submerged combustion melter comprising one or more submerged burners supplied with a combustible gas mixture that comprises fuel and oxygen, the glass melt having a redox ratio defined as a ratio of $Fe^{2+}$ to total iron in the glass melt;
   combusting the combustible gas mixture supplied to each of the submerged burners to produce combustion products, and discharging the combustion products from the one or more submerged burners directly into the glass melt to transfer heat to, and agitate, the glass melt, and to melt the vitrifiable feed material;
   adjusting the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt;
   drawing molten glass out of the submerged combustion melter from the glass melt;
   refining the molten glass to remove bubbles from the molten glass and to produce a refined molten glass having a density that is greater than a density of the molten glass drawn out of the submerged combustion melter;
   thermally conditioning the refined molten glass to produce conditioned molten glass; and
   forming the conditioned molten glass into at least one container.

2. The method set forth in claim 1, wherein adjusting the redox ratio of the glass melt comprises controlling any combination of two of the operating conditions of the submerged combustion melter.

3. The method set forth in claim 1, wherein adjusting the redox ratio of the glass melt comprises controlling all three of the operating conditions of the submerged combustion melter.

4. The method set forth in claim 1, wherein adjusting the redox ratio of the glass melt comprises increasing the redox ratio of the glass melt without modifying a composition of the vitrifiable feed material by adding or removing redox agents.

5. The method set forth in claim 1, wherein adjusting the redox ratio of the glass melt comprises decreasing the redox ratio of the glass melt without modifying a composition of the vitrifiable feed material by adding or removing redox agents.

6. The method set forth in claim 1, wherein the glass melt has a glass chemical composition that comprises 60 wt % to 80 wt % $SiO_2$, 8 wt % to 18 wt % $Na_2O$, and 5 wt % to 15 wt % CaO.

7. The method set forth in claim 1, further comprising:
   transitioning the glass melt from having a glass chemical composition formulated for one color of glass to a glass chemical composition formulated for another color of glass.

8. The method set forth in claim 1, wherein the combustible gas mixture includes pure oxygen and either methane or propane as the fuel.

9. The method set forth in claim 1, wherein, if controlled, the oxygen-to-fuel ratio of the combustible gas mixture supplied to each of the submerged burners is controlled to between 30% excess fuel relative to stoichiometry and 30% excess oxygen relative to stoichiometry, (2) the residence time of the glass melt is controlled to between 1 hour and 12 hours, and/or (3) the gas flux through the glass melt is controlled to between 0.01 NCM/kg-$hr^2$ and 0.08 NCM/kg-$hr^2$.

10. The method set forth in claim 1, wherein adjusting the redox ratio of the glass melt comprises increasing the redox ratio of the glass melt to render the glass melt more reduced.

11. The method set forth in claim 1, wherein adjusting the redox ratio of the glass melt comprises decreasing the redox ratio of the glass melt to render the glass melt more oxidized.

12. The method set forth in claim 1, wherein
   refining the molten glass comprises refining the molten glass at a temperature between 1400° C. and 1500° C., and wherein thermally conditioning the refined molten glass comprises thermally conditioning the refined molten glass at a temperature between 1050° C. and 1200° C.

13. A method of producing glass using submerged combustion melting, the method comprising:
   introducing a vitrifiable feed material into a glass melt contained within a submerged combustion melter, the submerged combustion melter comprising one or more submerged burners supplied with a combustible gas mixture that comprises fuel and oxygen, the glass melt having a redox ratio defined as a ratio of $Fe^{2+}$ to total iron in the glass melt;
   combusting the combustible gas mixture supplied to each of the submerged burners to produce combustion products, and discharging the combustion products from the one or more submerged burners directly into the glass melt to transfer heat to, and agitate, the glass melt;
   increasing the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt, wherein controlling the one or more operating conditions of the submerged combustion melter comprises at least one of (1) increasing the oxygen-to-fuel ratio of the combustible gas mixture supplied to each of the submerged burners, (2) decreasing the residence time of the glass melt, or (3) decreasing the gas flux through the glass melt;
   drawing molten glass out of the submerged combustion melter from the glass melt;

refining the molten glass to remove bubbles from the molten glass and to produce a refined molten glass having a density that is greater than a density of the molten glass drawn out of the submerged combustion melter;

thermally conditioning the refined molten glass to produce conditioned molten glass; and forming the conditioned molten glass into at least one container.

14. The method set forth in claim 13, wherein increasing the redox ratio of the glass melt comprises controlling any combination of two of the operating conditions of the submerged combustion melter.

15. The method set forth in claim 13, wherein increasing the redox ratio of the glass melt comprises controlling all three of the operating conditions of the submerged combustion melter.

16. The method set forth in claim 13, wherein, if controlled, the oxygen-to-fuel ratio of the combustible gas mixture supplied to each of the submerged burners is controlled to between 30% excess fuel relative to stoichiometry and 30% excess oxygen relative to stoichiometry, (2) the residence time of the glass melt is controlled to between 1 hour and 12 hours, and/or (3) the gas flux through the glass melt is controlled to between 0.01 NCM/kg-hr$^2$ and 0.08 NCM/kg-hr$^2$.

17. A method of producing glass using submerged combustion melting, the method comprising:

introducing a vitrifiable feed material into a glass melt contained within a submerged combustion melter, the submerged combustion melter comprising one or more submerged burners supplied with a combustible gas mixture that comprises fuel and oxygen, the glass melt having a redox ratio defined as a ratio of Fe$^{2+}$ to total iron in the glass melt;

combusting the combustible gas mixture supplied to each of the submerged burners to produce combustion products, and discharging the combustion products from the one or more submerged burners directly into the glass melt to transfer heat to, and agitate, the glass melt;

decreasing the redox ratio of the glass melt by controlling one or more operating conditions of the submerged combustion melter selected from (1) an oxygen-to-fuel ratio of the combustible gas mixture supplied to each of the submerged burners, (2) a residence time of the glass melt, and (3) a gas flux through the glass melt, wherein controlling the one or more operating conditions of the submerged combustion melter comprises at least one of (1) decreasing the oxygen-to-fuel ratio of the combustible gas mixture supplied to each of the submerged burners, (2) increasing the residence time of the glass melt, or (3) increasing the gas flux through the glass melt;

drawing molten glass out of the submerged combustion melter from the glass melt;

refining the molten glass to remove bubbles from the molten glass and to produce a refined molten glass having a density that is greater than a density of the molten glass drawn out of the submerged combustion melter;

thermally conditioning the refined molten glass to produce conditioned molten glass; and forming the conditioned molten glass into at least one container.

18. The method set forth in claim 17, wherein decreasing the redox ratio of the glass melt comprises controlling any combination of two of the operating conditions of the submerged combustion melter.

19. The method set forth in claim 17, wherein decreasing the redox ratio of the glass melt comprises controlling all three of the operating conditions of the submerged combustion melter.

20. The method set forth in claim 17, wherein, if controlled, the oxygen-to-fuel ratio of the combustible gas mixture supplied to each of the submerged burners is controlled to between 30% excess fuel relative to stoichiometry and 30% excess oxygen relative to stoichiometry, (2) the residence time of the glass melt is controlled to between 1 hour and 12 hours, and/or (3) the gas flux through the glass melt is controlled to between 0.01 NCM/kg-hr$^2$ and 0.08 NCM/kg-hr$^2$.

21. The method set forth in claim 1, wherein the glass melt comprises 0 to 0.08 weight percent of Fe$_2$O$_3$ and FeO.

22. The method set forth in claim 1, wherein the redox ratio of the glass melt is adjusted to 0.8 or less.

23. The method set forth in claim 1, wherein the redox ratio of the glass melt is adjusted to 0.4 or less.

24. The method set forth in claim 1, wherein the redox ratio of the glass melt is adjusted to 0.4 to 0.6.

25. The method set forth in claim 1, wherein the redox ratio of the glass melt is adjusted to 0.6 to 0.8.

* * * * *